June 14, 1960
H. P. PHILLIPS
2,940,803
PISTON RING ASSEMBLY FOR INTERNAL COMBUSTION
ENGINES AND PISTON RING ELEMENTS THEREFOR
Filed March 23, 1959
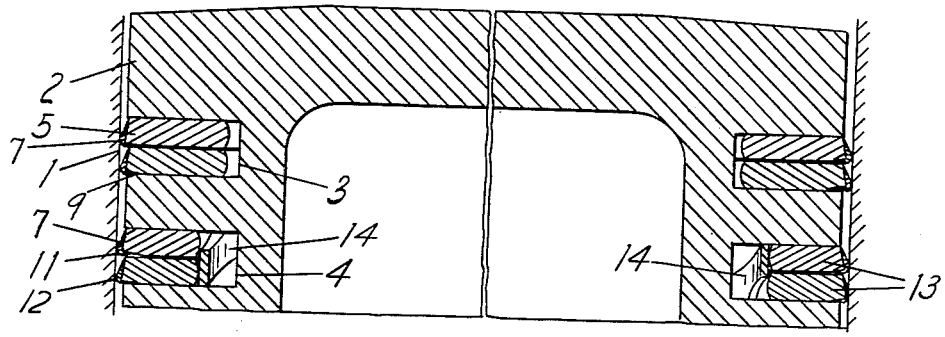
Fig. 1.
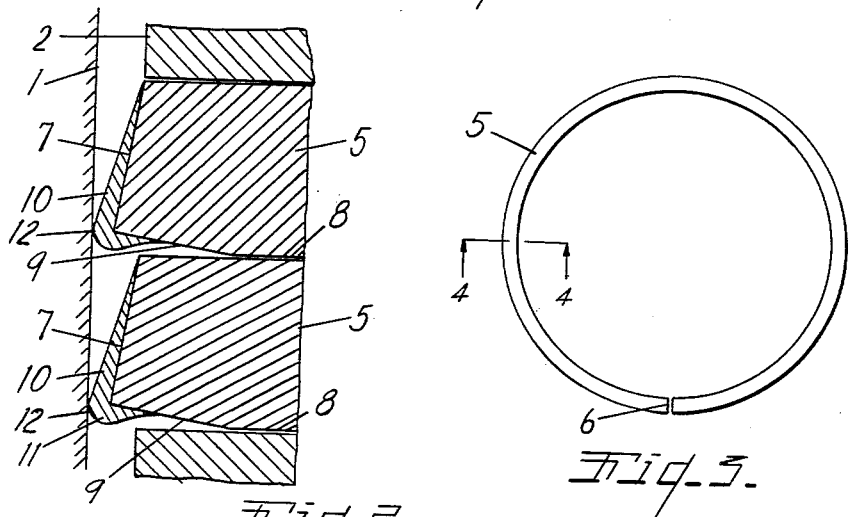
Fig. 2.
Fig. 3.
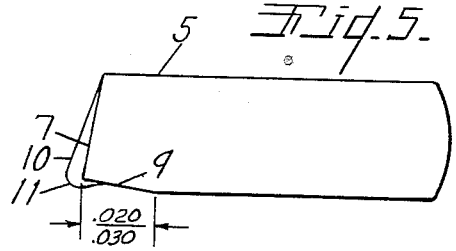
Fig. 4.
Fig. 5.
INVENTOR.
Harold P. Phillips
BY
Otto A. Earl
ATTORNEY.

United States Patent Office 2,940,803
Patented June 14, 1960

2,940,803

PISTON RING ASSEMBLY FOR INTERNAL COMBUSTION ENGINES AND PISTON RING ELEMENTS THEREFOR

Harold P. Phillips, Hastings, Mich., assignor to Hastings Manufacturing Company, Hastings, Mich.

Filed Mar. 23, 1959, Ser. No. 801,013

10 Claims. (Cl. 309—44)

This invention relates to piston ring assemblies for an internal combustion engine and one which is highly desirable for use in four cycle type engines, two cycle type engines, and also for diesel type engines.

The main objects of this invention are,

First, to provide a piston ring assembly which is highly efficiently as a compression ring assembly and at the same time minimizes fouling such as results from the escape of lubricant into the combustion chamber.

Second, to provide a piston ring assembly which is well adapted and highly efficient for use in high speed internal combustion engines and maintains its efficiency for over relatively long periods of use.

Third, to provide a so-called compression piston ring assembly which is not materially affected by high temperatures.

Fourth, to provide a piston ring element having these several advantages which may be very economically produced.

Objects relating to details and economies of the invention will appear from the description to follow. The invention is defined and pointed out in the claims.

A preferred embodiment of the invention is illustrated in the accompanying drawing, in which:

Fig. 1 is a fragmentary longitudinal section of a piston ring assembly embodying my invention, certain parts being shown conventionally and without special regard to dimensions.

Fig. 2 is an enlarged fragmentary view further illustrating structural details.

Fig. 3 is a side elevational view of one of the piston ring elements, no attempt being made to illustrate the peripheral or face bevel of the ring element, but illustrating that it is a split element.

Fig. 4, is an enlarged cross-sectional view of one of the ring elements embodying my invention.

Fig. 5 is a view illustrating a desirable degree of face and side bevels and their relation to each other.

In considering these drawings, it should be understood that they are not made to scale, but are greatly enlarged insofar as the piston ring grooves and the thickness of the ring elements and the chrome plating thereon are concerned.

While piston ring grooves vary in width and depth in commercial production, the ring elements dimensioned as stated are for a groove of approximately .095 in width. The axial thickness of the ring elements may vary considerably, but may be .045 which results in a clearance of .005.

The ring elements are formed of ribbon steel coiled edgewise and this results in a slight outward taper which I have not attempted to illustrate in the accompanying drawing. The clearance for the ring elements in the groove should be such as to permit the ring elements to expand and contract independently relative to each other.

In the accompanying drawing 1 represents a cylinder wall, 2 a piston provided with a compression ring groove 3 and a second groove 4. A pair of piston ring elements 5, 5 are disposed in the compression ring groove 3 which, it will be noted, is without drainage and that also applies to the groove 4. The ring elements 5 are formed of ribbon steel coiled edgewise and have splits 6 therein permitting them to expand and contract to maintain contact with the cylinder wall. It will be understood that while cylinder walls are initially of the same diameter from top to bottom, the walls do wear in use and one object of the invention is to provide an effective seal under such wear conditions and irregularities as may result from wear. Such conditions are well known. The important factor of my invention is that my piston ring assemblies are highly efficient in preventing blow-by or maintaining an effective seal of the combustion chamber and at the same time preventing the fouling thereof by lubricant passing the piston rings.

The piston ring elements 5 are formed of ribbon steel coiled edgewise and are provided with continuously beveled or upwardly inclined peripheral faces 7. The under or bottom sides 8 of the ring element have side bevels 9 which intersect or meet the bevel faces of the ring, desirably substantially at right angles, that being what is illustrated in the drawing. The bevels 9 are 10° bevels while the bevel faces are upwardly inclined so that these faces and the side bevels are in approximately 90° angular relation to each other. However, the inclination of the face of the ring may be considerably varied. The chrome plating, designated by the numeral 10, is lappingly extended onto the bevel 9 at 11, the main purpose of the bevel 9 being to permit this lapping so that the cylinder wall contacting point 12 of the chrome is closely adjacent the lower side face 8 of the ring elements. The chrome on the face of the ring gradually tapers or gradually diminishes in thickness from the contact zone 12 toward the upper side of the ring. This arrangement permits an effective bonding of the chrome to the ring elements and the cylinder wall contact is in approximately the plane of intersection of the bevels of the ring elements, that is, the inclined face thereof and the side bevels and the contact point is substantially a line. When the rings are installed they quickly wear in so far as any slight irregularities in the plating is concerned, and a narrow contact is maintained throughout the life of the ring. The bevel on the under side of the ring is sufficient so that the chrome may overlap the ring at 11 and does not interfere with the cylinder wall, and a clearance is provided for the upper ring of the assembly, that is, the rings may expand and contract within the groove independently of each other. With this arrangement a highly effective compression seal is provided as well as effectively preventing the passage of lubricant. The ring elements do not provide pockets for the lubricant. As a commercial example, cylinders in which the compression groove is 3/32 of an inch in width are extensively used. For such grooves the applicant recommends ring elements of his invention of a thickness of .045 plus or minus .0005. This insures that the ring elements have free radial movement in the groove and relative to each other. With grooves of other widths the actual thickness of the ring is desirably varied to provide the indicated amount of clearance which is sufficient to permit the independent expansion and contraction of the ring elements without undesirable clearance.

In the embodiment illustrated, the ring elements designated generally by the numerals 13 are the same as described with the exception that they are of less radial width and are provided with an expander 14. These ring grooves 3 and 4 are commonly designated as first and second compression ring grooves. It is not deemed desirable to provide expander rings 14 in the grooves 3 as the heat to which it would be normally subjected destroys its tension. In Fig. 5 I conventionally illustrate the desirable inclined or beveled face and side. The side bevel may desirably extend .020 to .030 of an inch as is indicated. That does not materially detract from the resilience of the ring, but does provide clearance for the overlapping chrome on the beveled surface.

I have illustrated and described my invention in a highly practical commercial embodiment, and it is believed that this disclosure will enable those skilled in the art to embody or adapt my invention to engines having cylinders and pistons of varying dimensions and to engines of the four cycle, two cycle, and diesel types.

What is claimed as new is:

1. In combination, a piston having a compression ring groove adjacent its head, and two split radially expandable ring elements of substantially the same axial thickness formed of ribbon steel coiled edgewise disposed in said groove in side by side relation, the combined axial thickness of the said ring elements relative to the width of the groove being such as to provide clearance permitting the ring elements to expand and contract within the groove independently relative to each other, said ring elements being without substantial dish and each having a continuous beveled upwardly inclined peripheral face and a bevel of approximately 10° on the underside thereof intersecting the said peripheral bevel, the peripheral and side bevels being at approximately 90° angle relative to each other, said ring element having chrome plating on its peripheral face lappingly extended onto the bevel on its under side, the zone of greatest thickness of the chrome plating being in approximately the plane of intersection of said bevels of said ring element and extending from but in gradually diminishing thickness from said zone substantially across the peripheral face of the ring element, the width of the bevel on the under side of said side of said ring element being of the order of .020 to .030 of an inch.

2. In combination, a piston having a compression ring groove adjacent its head, and two split radially expandable ring elements of substantially the same axial thickness formed of ribbon steel coiled edgewise disposed in said groove in side by side relation, the combined axial thickness of the said ring elements relative to the width of the groove being such as to provide clearance permitting the ring elements to expand and contract within the groove independently relative to each other, said ring elements being without substantial dish and each having a continuous beveled upwardly inclined peripheral face and a bevel on the underside thereof intersecting the said peripheral bevel, said ring element having chrome plating on its peripheral face lappingly extended onto the bevel on its underside, the zone of greatest thickness of the chrome plating being in approximately the plane of intersection of said bevels of said ring element and extending from but in gradually diminishing thickness from said zone.

3. In combination, a piston having a ring groove therein without drain opening, and split radially expandable ring elements formed of ribbon steel coiled edgewise disposed in said groove in side by side relation, a combined axial thickness of said ring elements relative to the width of the groove being such as to provide clearance permitting the ring element to expand and contract within the groove independently of each other while maintaining them in side by side coacting relation, said ring elements being without substantial dish and each having an upwardly inclined peripheral face and a bevel of approximately 10° on the underside surface thereof intersecting the inclined peripheral face, the inclined peripheral face and side bevel being in approximately right angle relation to each other, said ring element having chrome plating on its peripheral face lappingly extended on to the bevel on its under side, the zone of greatest thickness of the chrome and cylindrical wall contacting zone thereof being approximately radially aligned with the intersecting of said peripheral face and said side bevel of the ring element and lapping upon said side bevel and extending substantially but in gradually diminishing thickness upon the peripheral face of the ring element.

4. In combination, a piston having a ring groove therein without drain opening, and split radially expandable ring elements formed of ribbon steel coiled edgewise disposed in said groove in side by side relation, a combined axial thickness of said ring elements relative to the width of the groove being such as to provide clearance permitting the ring element to expand and contract within the groove independently of each other while maintaining them in side by side coacting relation, said ring elements each having an upwardly inclined peripheral face and a bevel on the underside surface thereof intersecting the inclined peripheral face, said ring element having chrome plating on its peripheral face lappingly extended onto the bevel on its under side, the zone of greatest thickness of the chrome and cylindrical wall contacting zone thereof being closely adjacent to the plane of the bottom side of the ring element.

5. In combination, a piston having a ring groove therein without drain opening, and split radially expandable ring elements formed of ribbon steel coiled edgewise disposed in said groove in side by side relation, the combined axial thickness of the ring elements relative to the width of the groove being such as to provide clearance permitting the ring elements to expand and contract within the groove independently of each other while maintaining them in side by side relation, the ring elements each having an upwardly inclined beveled peripheral face terminating closely adjacent to the under side of the ring element, the ring element having a bevel on its under side intersecting its peripheral face, said ring element having chrome plating on its peripheral face lappingly extended upon said bevel on its under side but projecting downwardly beyond the plane of the under side of the ring element, the chrome plating upon the peripheral face extending substantially across the same and being of upwardly diminishing thickness and curvedly merging into the portion of the plating lapped upon the beveled side portion of the ring element which is of radially inwardly decreasing thickness whereby the thickest portion of the chrome plating is closely adjacent the plane of the under side of the ring element and substantially a line contact closely adjacent the plane of the under side of the ring is initially presented to the cylinder wall.

6. A split radially expandable piston ring element formed of ribbon steel coiled edgewise, said ring element being without substantial dish and having a continuous beveled upwardly inclined peripheral face and a bevel of approximately 10° on the underside thereof intersecting the said peripheral bevel, the peripheral and side bevels being at approximately 90° angle relative to each other, said ring element having chrome plating on its peripheral face lappingly extended onto the bevel on its under side, the zone of greatest thickness of the chrome plating being in approximately the plane of intersection of said bevels of said ring element and extending from but in gradually diminishing thickness from said zone substantially across the face of the ring element, the width of the bevel on the under side of said side of said ring element being of the order of .020 to .030 of an inch.

7. A split radially expandable piston ring element formed of ribbon steel coiled edgewise, said ring element being without substantial dish and having a continuous beveled upwardly inclined peripheral face and a bevel on the underside thereof intersecting the said peripheral bevel, said ring element having chrome plating on its peripheral face lappingly extended onto the bevel on its underside, the zone of greatest thickness of the chrome plating being in approximately the plane of intersection of said bevels of said ring element and extending from but in gradually diminishing thickness from said zone substantially across the peripheral face of the ring element.

8. A split radially expandable ring element formed of ribbon steel coiled edgewise having a continuous beveled face and a bevel of approximately 10° on the under surface thereof intersecting the said peripheral bevel, the peripheral and side bevels being at approximately 90° angles relative to each other, said ring element having chrome plating on its peripheral surface lappingly extended onto the bevel on its side surface, the zone of greatest thickness of the chrome plating being in approximately the plane of intersection of said bevels of the ring element and being of gradually diminishing thickness from said zone on the peripheral face of the ring element.

9. A split radially expandable ring element formed of ribbon steel coiled edgewise having a continuous beveled peripheral face and a bevel on the under surface thereof intersecting the said beveled peripheral face, said ring element having chrome plating on its peripheral face lappingly extended onto the bevel on its side surface, the zone of greatest thickness of the chrome plating being in approximately the plane of intersection of said bevels of the ring element.

10. A split radially expandable ring element formed of ribbon steel coiled edgewise and having an upwardly inclined beveled peripheral face terminating closely adjacent to its underside, and having a bevel on its under side intersecting its said peripheral face, said ring element having chrome plating on its peripheral face lappingly extended upon said bevel on its under side, but not projecting downwardly beyond the plane of the under side of the ring element, the chrome plating upon the peripheral face extending substantially across the same end being of upwardly diminishing thickness and curvedly merging into the plating lapped upon the beveled under side portion of the ring element and being of radially inward decreasing thickness whereby the thickest portion of the chrome plating is closely adjacent the plane of the under side of the ring element, and a substantially line contact closely adjacent the plane of the under side of the ring element is initially presented to a cylinder wall.

References Cited in the file of this patent

UNITED STATES PATENTS 2,772,129    Frisby                Nov. 27, 1956

FOREIGN PATENTS 726,954    Great Britain         Mar. 23, 1955